(«United States Patent» [19]

Murano et al.

[11] Patent Number: 5,069,086
[45] Date of Patent: Dec. 3, 1991

[54] BELT RATIO CONTROLLER FOR A CONTINUOUSLY VAIABLE TRANSMISSION

[75] Inventors: Katsuaki Murano; Yoshinori Yamashita; Sadayuki Hirano, all of Shizuoka; Takumi Tatsumi; Hiroaki Yamamoto, both of Hyogo, all of Japan

[73] Assignees: Suzuki Jidosha Kogyo Kabushiki Kaisha, Shizuoka; Mitsubishi Denki Kabushiki Kaisha, Tokyo, both of Japan

[21] Appl. No.: 443,707

[22] Filed: Nov. 29, 1989

[30] Foreign Application Priority Data

Nov. 30, 1988 [JP] Japan ................. 63-302731

[51] Int. Cl.⁵ .............................................. B60K 41/14
[52] U.S. Cl. ........................................ 74/866; 74/844; 474/12
[58] Field of Search ................... 74/866, 844; 474/12, 474/18, 69, 70

[56] References Cited

U.S. PATENT DOCUMENTS

| 4,670,843 | 6/1987 | Matsumura et al. ............. 474/28 X |
| 4,730,518 | 3/1988 | Miyawaki ........................... 74/866 |
| 4,743,223 | 5/1988 | Tokoro et al. ........................ 474/69 |
| 4,757,870 | 7/1988 | Torii et al. ........................ 74/866 X |
| 4,858,498 | 8/1989 | Bouda ................................. 74/866 |
| 4,907,471 | 3/1990 | Ishimaru ............................. 74/745 |

FOREIGN PATENT DOCUMENTS

| 2437264 | 2/1976 | Fed. Rep. of Germany ........ 74/844 |
| 57-186656 | 11/1982 | Japan . |
| 58-21049 | 2/1983 | Japan .............................. 74/844 |
| 59-43249 | 3/1984 | Japan . |
| 59-77159 | 5/1984 | Japan . |
| 61-233256 | 10/1986 | Japan . |

Primary Examiner—Allan D. Herrmann
Assistant Examiner—Benjamin Levi
Attorney, Agent, or Firm—Flynn, Thiel, Boutell & Tanis

[57] ABSTRACT

A continuously variable transmission which effects a speed change by increasing and decreasing the width of a groove between a fixed pulley part and a movable pulley part. A belt ratio controller for the transmission uses oil pressure to increase and decrease the rotating radius of a belt wound on the pulley parts, the belt controller controlling the belt ratio to a target belt ratio value set based on the opening of the throttle when starting on a road having a small road surface friction coefficient.

10 Claims, 5 Drawing Sheets

BELT RATIO CONTROLLER FOR A CONTINUOUSLY VAIABLE TRANSMISSION

FIELD OF THE INVENTION

The present invention relates to a belt ratio controller for a continuously variable transmission and, more specifically, to a belt ratio controller for a continuously variable transmission which is capable of preventing vehicle wheels from slipping at the time of starting vehicle movement on a road having a small road surface friction coefficient, to facilitate easy starting.

BACKGROUND OF THE INVENTION

In a vehicle, a transmission is interposed between an internal combustion engine and the driving wheels. This transmission changes the driving force applied to and the speed of the driving wheels to meet the travel condition of the vehicle according to a wide range, in order to optimize the performance of the internal combustion engine. One known continuously variable transmission includes a pulley having a fixed pulley part fixed to a shaft and a movable pulley part axially movably supported on the shaft separate from the fixed pulley part, the width of a groove formed between the pulley parts being increased and decreased by oil pressure control to increase and decrease the rotating radius of a power transfer belt wound on the pulley, thereby changing the belt ratio. Continuously variable transmissions of this type have been disclosed for instance in Japanese Patent Laid Open Publication Nos. Sho 186656/1982, Sho 43249/1984, Sho 77159/1984 and Sho 233256/1986.

The continuously variable transmissions have an oil pressure clutch for controlling the power transmission using oil pressure. This oil pressure clutch is controlled differently in various types of control modes, based on signals representing the number of revolutions of the engine, the throttle valve position of a carburetor, or the like.

In the conventional belt ratio controller for a continuously variable transmission, the belt ratio, if the speed of a vehicle is ≦5 km/h (including a stop time), is controlled to a full low condition by open loop control using an output duty ratio value of 0. After starting, when the speed of the vehicle is raised to bring the clutch slip to substantially zero, the oil pressure clutch is engaged to start to control the number of revolutions of the engine to a target value determined from a shift selector position, the opening of the throttle and the speed of the vehicle. The belt ratio is controlled to be between the full low and overdrive conditions when the number of revolutions of the engine starts to be controlled, thereby changing the speed.

In a case where the vehicle is started on the snow in a cold place or on a frozen road (especially where the vehicle is started on a slope), namely when a friction coefficient on a road surface is small, a transfer torque is large in the full low condition of the belt ratio, so that when abruptly stepping on an accelerator pedal, the wheels slip and cause the vehicle inconveniently to be incapable of starting to move.

When the slipping state of the wheels is continued for a long time, the control arrangement decides to adjust the speed of the vehicle and the oil clutch is engaged, so that the slip of the wheels is further continued and causes friction heat therefrom to dissolve the snow or ice and the vehicle to inconveniently be permanently incapable of being started.

A purpose of the present invention is to provide a belt ratio controller for a continuously variable transmission which controls the belt ratio to a target belt ratio value set by the opening of the throttle at the time of starting on a road having a small road surface friction coefficient in order to avoid the aforementioned inconveniences, thereby transferring a low engine torque preventing the wheels from slipping, to facilitate easy starting of the vehicle.

SUMMARY OF THE INVENTION

In order to attain this purpose, the present invention provides a belt ratio controller for a continuously variable transmission of the type which effects a speed change by increasing and decreasing the width of a groove between a fixed pulley part and a movable pulley part by using oil pressure in order to increase and decrease the rotating radius of a belt wound on the pulley parts, the belt controller controlling the belt ratio to the target belt ratio value set by the opening of the throttle when starting on a road having a small road surface friction coefficient.

According to the present invention, the control arrangement sets the belt ratio to the target belt ratio determined from the opening of the throttle when starting on a road having a small road surface friction coefficient, so that the transmission does not start in a full low ratio but instead an intermediate belt ratio in order to transfer a low engine torque and prevent the vehicle wheels from slipping, which facilitates easily starting vehicle movement.

BRIEF DESCRIPTION OF THE DRAWINGS

An embodiment of the present invention will be explained in detail hereinbelow with reference to the accompanying drawings, in which.

DETAILED DESCRIPTION

Figure 1:
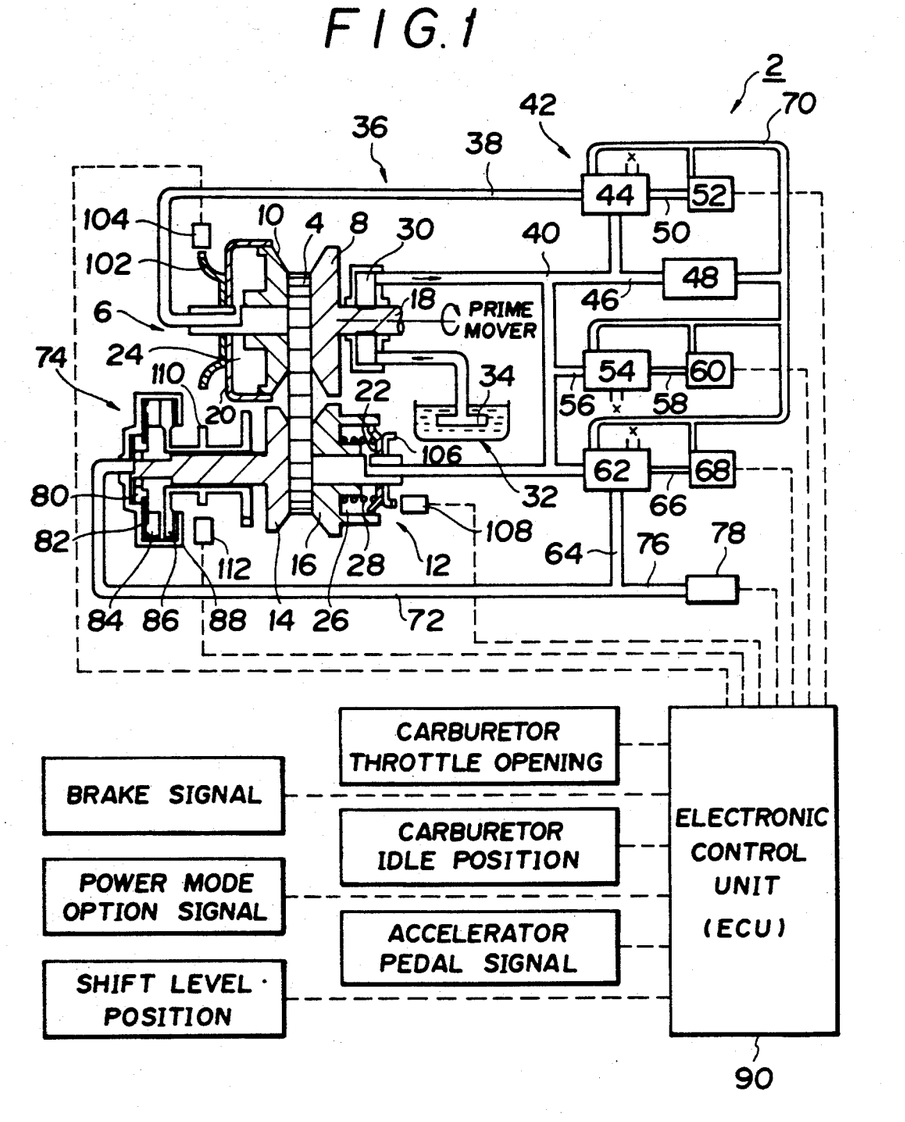
FIG. 1 is a diagrammatic view of a continuously variable transmission and its hydraulic control circuit.

FIGS. 1 to 5 show the embodiments of the present invention. In FIG. 1, reference numeral 2 indicates the continuously variable transmission, 4 a belt, 6 a driving side pulley, 8 a driving side fixed pulley part, 10 a driving side movable pulley part, 12 a driven side pulley, 14 a driven side fixed pulley part, and 16 a driven side movable pulley part. The driving side pulley 6 has the driving side fixed pulley part 8 fixed to a rotating shaft 18 rotated by a motor, as shown in FIG. 1, and the driving side movable pulley part 10 is supported on the shaft 18 so as to be movable in the direction of the axis of the shaft 18 but not to rotate relative thereto. The driven side pulley 12 is constructed similar to the driving side pulley 6 with regard to its driven side fixed pulley part 14 and driven side movable pulley part 16.

The driving side movable pulley part 10 and driven side movable pulley part 12 have respective first and second housings 20 and 22 mounted thereon to form respective first and second oil pressure chambers 24 and 26. In the second oil pressure chamber 26 for the driven side, a pressing spring 28 urges the driven side movable pulley part 16 toward the driven side fixed pulley part 14.

On an end part of the shaft 18, an oil pump 30 is provided. This oil pump 30 feeds oil from an oil pan or sump 32 to the first and second oil pressure chambers 24 and 26 through first and second oil passages 38 and 40 of an oil pressure circuit via an oil filter 34. The first oil passage 38 communicates with a primary pressure control valve 44 of a speed change control valve constituting a pressure control unit 42 so as to control the primary pressure of an input shaft sheave pressure. A constant pressure control valve 48 for controlling a line pressure from line 40 (generally 5 to 25 kg/cm$^2$) to a constant pressure in line 70 (for instance, 3 to 4 kg/cm$^2$) communicates through a third oil passage 46 with the second oil passage 40 from the oil pump 30. Further, the primary pressure control valve 44 communicates with a first three-way electromagnetic valve 52 for controlling the primary pressure through a fourth oil passage 50.

The third oil passage 40 communicates with a line pressure control valve 54 having a release or regulating valve function for controlling the line pressure or pump pressure through a fifth oil passage 56. The line pressure control valve 54 is connected to a second threeway electromagnetic valve 60 through a sixth oil passage 58.

Further, the second oil passage 40, between the second oil pressure chamber 26 and line pressure control valve 54, communicates with a clutch pressure control valve 62 for controlling a clutch pressure. This clutch pressure control valve 62 communicates with a third three-way electromagnetic valve 68 through an eighth oil passage 66.

The primary pressure control valve 44, the primary pressure controlling first electromagnetic valve 52, the constant pressure control valve 48, the line pressure control valve 54, the line pressure controlling second three-way electromagnetic valve 60, the clutch pressure control valve 62 and the clutch pressure controlling third three-way electromagnetic valve 68 each communicate with a ninth oil passage 70.

The clutch pressure control valve 62 is connected to an oil pressure controlled clutch 74 through a tenth oil passage 72 and a seventh oil passage 64. The tenth oil passage 72 communicates with a pressure intensifier or sensor 78 through a path 76. This pressure intensifier 78 can directly detect the clutch oil pressure at the time of controlling the clutch pressure in hold and start modes etc., and helps in controlling the detected oil pressure to be a target clutch pressure and controlling the line pressure in drive mode since the clutch pressure is then substantially equal to the line pressure.

The oil pressure clutch includes a piston 80, an annular spring 82, a first pressure plate 84, a friction plate 86, and a second pressure plate 88.

A microprocessor-based electronic control unit (ECU) 90 is provided for controlling a speed change based on inputting of various conditions such as the state of pressure sensor 78, the opening degree of the throttle of a carburetor (not shown) of the vehicle and the speed of revolution of the engine, in particular by controlling the opening and closing of the primary pressure controlling first three-way electromagnetic valve 52, the line pressure controlling second three-way electromagnetic valve 60 and the clutch pressure controlling third three-way electromagnetic valve 68.

Various input signals inputted to the control unit 90 will now be described in detail as to their functions:

1. Signal indicating a shift lever position

Facilitates control of the line pressure, belt ratio and clutch pressure required for respective ranges represented by respective shift position signals such as P, R, N, D and L.

2. Signal indicating the opening degree of a carburetor throttle

Facilitates correction of a carburetor throttle opening sensor and improvement of accuracy in the control.

3. Accelerator pedal signal

Indicates the degree of stepping down of an accelerator pedal, from which the intention of a driver is detected to facilitate control at the time of travel or starting.

4. Brake signal

Indicates the presence and absence of stepping on a brake pedal and facilitates disengagement control of the clutch.

5. Power mode option signal

This optional driver-controlled signal selects sporty power performance or economical performance.

Figure 2:
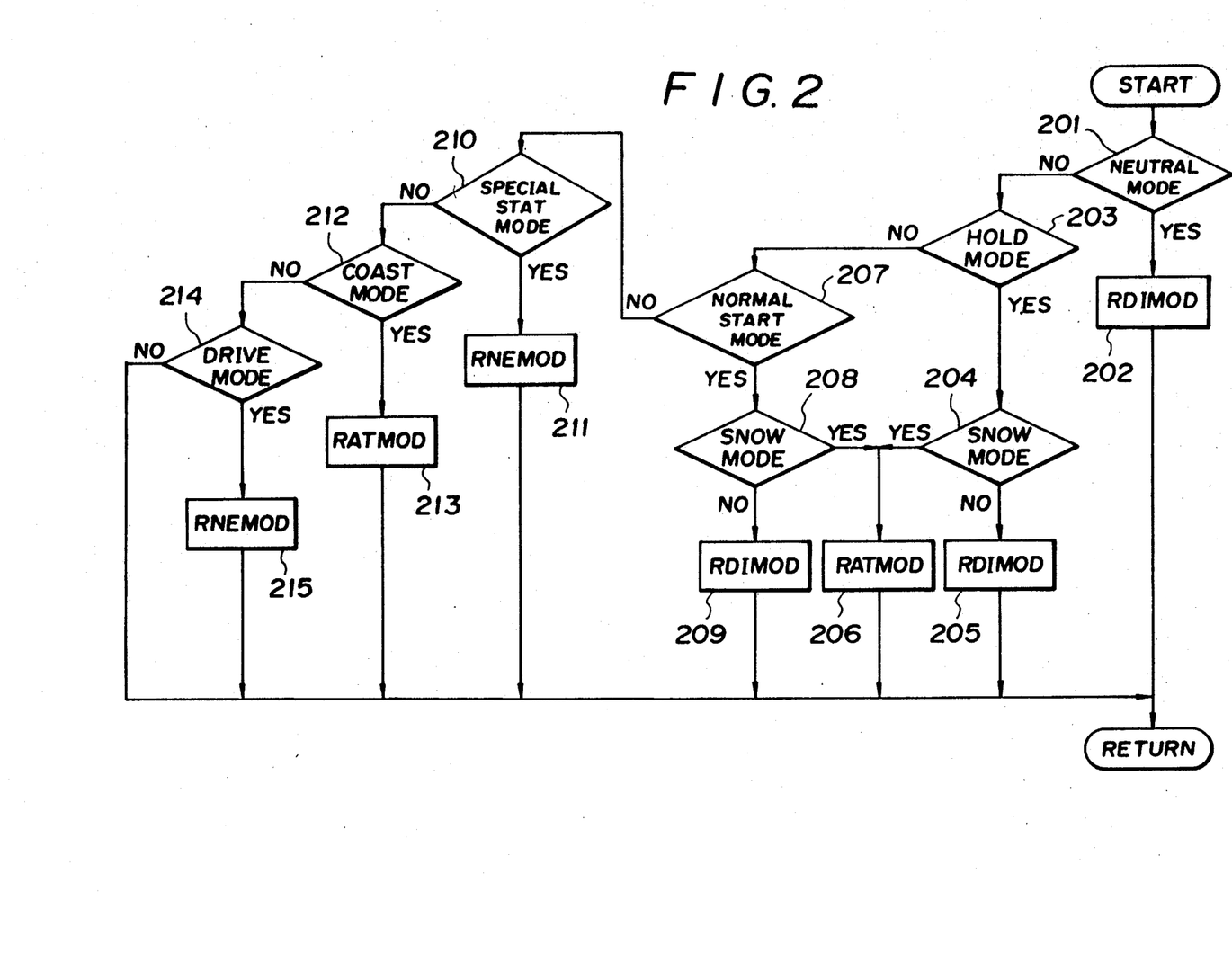
FIG. 2 is a flowchart showing the operation of part of a control unit of the embodiment of FIG. 1.
Figure 4:
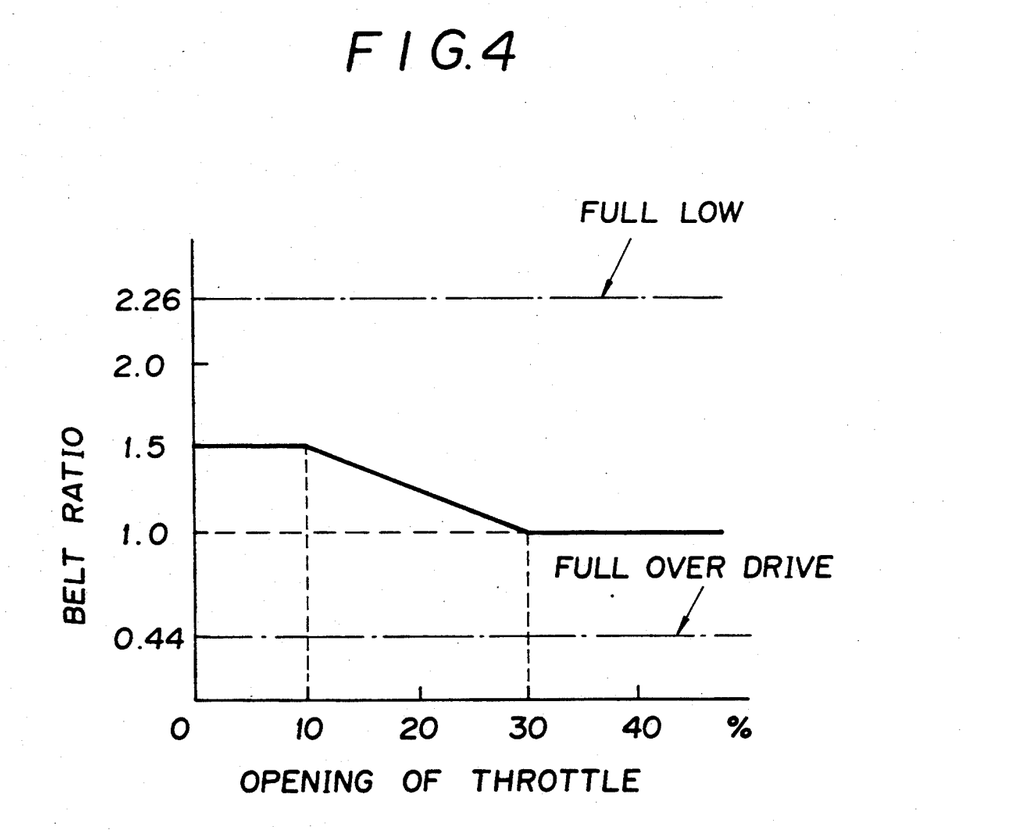
FIG. 4 is a memory map for a portion of the control function of FIG. 3 and shows a relation between the opening of a throttle and a target belt ratio value.
Figure 5:
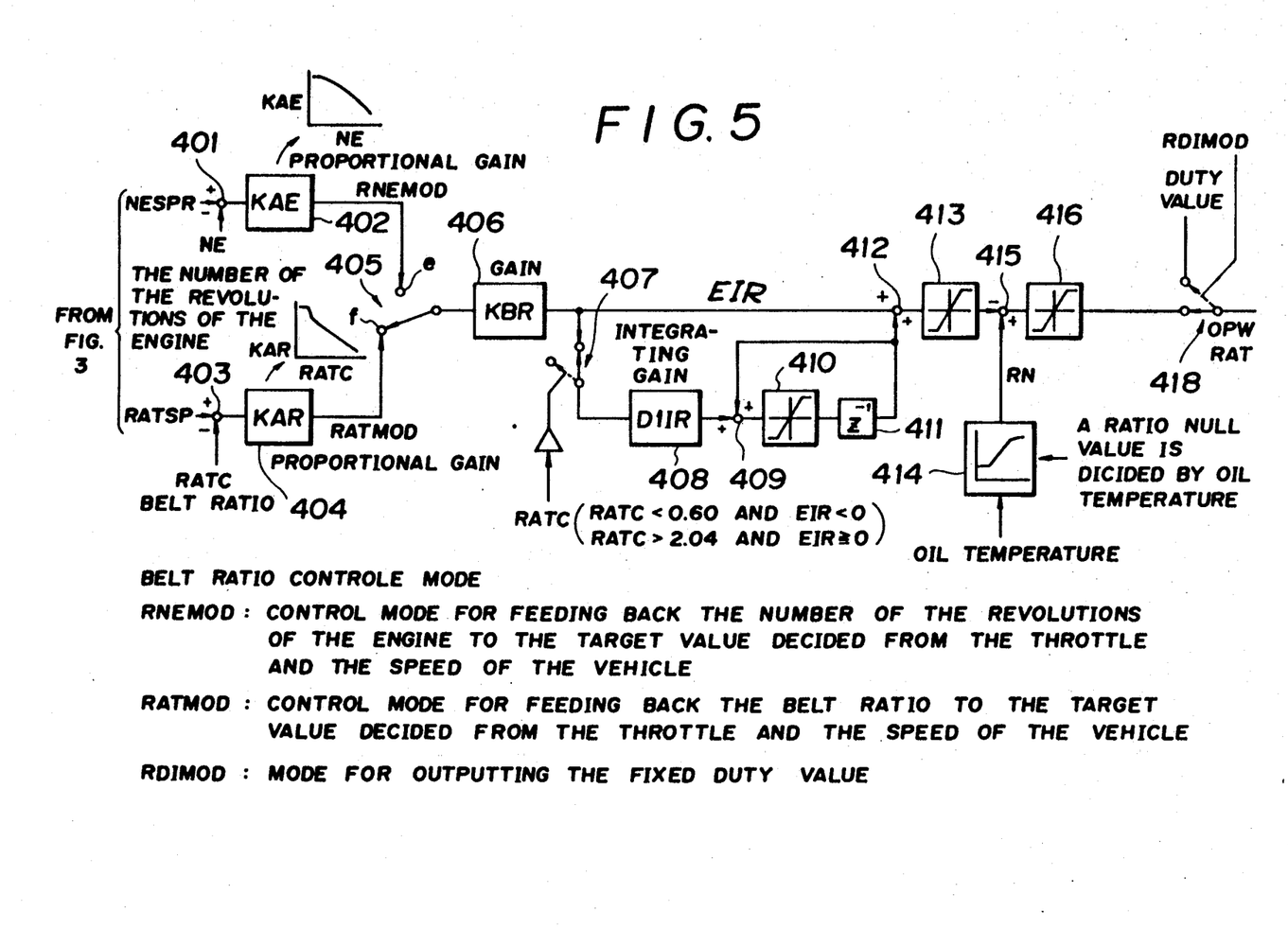
FIG. 5 is a block diagram of a further part of the control function for belt ratio control.

The control arrangement controls the belt ratio to have the target belt ratio value determined from the opening of the throttle, namely by controlling the operations of the respective electromagnetic valves, when starting the vehicle on a road having a small road surface friction coefficient, such as a snowy or frozen road in a cold place. More specifically, as shown in FIG. 2, when an input signal to the control unit 90 is turned on, for instance by using an optional snow mode switch, the control is directed at 204 and 208 to 206, where the control mode RATMOD of the belt ratio is implemented to effect feeding back of the belt ratio RATC to the target belt ratio value RATSP, as shown in FIG. 5 and as described in more detail later. When this target belt ratio value RATSP is to be used because of the selection of the snow mode, then as shown at 309 in FIG. 3 and as described in detail later, RATSP is set according to the opening of the throttle from a memory map (for instance the map shown in FIG. 4 and relating the opening of the throttle to target belt ratio values). The target belt ratio value RATSP according to the memory map in FIG. 4 represents a value roughly equivalent to the drive ratio of the second or third gear of a conventional manual transmission. In the memory map in FIG. 4, when the opening of the throttle is small, the target belt ratio value is defined to be 1.5 and when the opening of the throttle is more than 30%, the target belt ratio value RATSP is defined to be 1.0.

Namely, when the opening of the throttle is large, the engine torque is increased and tends to cause wheel spinning which would disable the vehicle from starting, and therefore in compensation the target belt ratio value RATSP is set to be smaller in that case than when the opening of the throttle is small. Accordingly, when the switch for the snow mode is turned on in a hold mode or a normal start mode, the belt ratio is controlled by the target belt ratio value RATSP to facilitate starting on a snowy road. The snow mode is effective only with the hold mode and the normal start mode, and in a drive mode after the oil pressure controlled clutch 74 is locked up, control is shifted to an engine revolution control mode RENEMOD implementing the same control as for ordinary travel.

As shown in FIG. 5, in the case of the snow mode, the belt ratio control mode RATMOD is selected at 406 to effect feed back of the belt ratio.

As shown in FIG. 1, an input shaft rotation detecting gear 102 is externally secured to the first housing 20 and a first rotation detector 104 for the input shaft is disposed in the vicinity of the peripheral part of detecting gear 102. An output shaft rotation detecting gear 106 is externally secured to the second housing 22 and a second rotation detector 108 for the output shaft is disposed in the vicinity of the peripheral part of detecting gear 106. The detecting signals of the first rotation detector 104 and the second rotation detector 108 are supplied to the control unit 90 and used for determining the speed of revolution of the engine, and the belt ratio. An output power transmitting gear 110 is coupled to the final output shaft of the oil pressure clutch 74, and a third rotation detector 112 for detecting the rotation of the final output shaft is disposed in the vicinity of the peripheral part of gear 110. Namely, the third rotation detector 112 detects the rotational speed of the final output shaft, which is coupled to a not-illustrated reduction gear, differential, driving shaft, and tire, and can thus be used to detect the speed of the vehicle. The rotation of the input shaft and the output shaft can be detected by the second rotation detector 108 and third rotation detector 112 to detect the amount of slip of the clutch.

The operation of this embodiment will be explained hereinbelow:

As shown in FIG. 1, in the continuously variable transmission 2, the oil pump 30 situated on the shaft 18 operates according to the rotation of the shaft 18 and oil from the oil pan 32 is drawn through the oil filter 34. The line pressure or pump pressure is controlled by the line pressure control valve 54, and when the quantity of fluid released through the line pressure control valve 54 is large the line pressure is lowered, whereas when the release is small the line pressure is higher.

The line pressure control valve 54 is controlled by the second exclusive three-way electromagnetic valve 60, and in particular the line pressure control valve 54 operates by following the operation of the second threeway electromagnetic valve 60. The second three-way electromagnetic valve 60 is controlled by varying the duty ratio of a constant frequency control signal. Namely, a duty ratio of 0% indicates that the second three-way electromagnetic valve 60 is not operated and an output side is continuously coupled to the atmosphere to bring the oil pressure in path 58 to zero (atmospheric pressure). A duty ratio of 100% indicates that the second three-way electromagnetic valve 60 continuously operates and couples its output side continuously to its input side at 70 and thus obtains in path 58 the maximum output oil pressure, which is the same as the control pressure at 70. Namely, the output oil pressure at 58 is changed according to the change of the duty ratio to the second three-way electromagnetic valve. Accordingly, the operation of the second threeway electromagnetic valve 60 causes the line pressure control valve 54 to analogically operate, whereby changing the duty ratio of the control signal for the second three-way electromagnetic valve 60 controls the line pressure at 40. The operation of the second threeway electromagnetic valve 60 is controlled by the control unit 90.

A speed change controlling primary pressure in line 38 is controlled by the primary pressure control valve 44, and the operation of this primary pressure control valve 44 is controlled by the first exclusive three-way electromagnetic valve 52 in a manner similar to control of the line pressure control valve 54 by valve 60. The first three-way electromagnetic valve 52 is used to cause valve 44 to connect the primary pressure at 38 to the line pressure at 40 or to the atmosphere, connection to the line pressure shifting the belt ratio to full overdrive and connection to the atmosphere shifting it to full low, full overdrive and full low respectively being the upper and lower limits of the range of available belt ratios.

The clutch pressure control valve 62 for controlling the clutch pressure at 72 is connected to the line pressure at 40 at a time requiring a maximum clutch pressure, and is connected to the atmosphere at a time requiring a minimum clutch pressure. This clutch pressure control valve 62 is controlled by the third exclusive three-way electromagnetic valve 68 in a manner similar to control of the line pressure control valve 54 or primary pressure control valve 44, so that the explanation thereof will be omitted herein. The clutch pressure is changed within the range from a minimum (atmospheric pressure or zero) to a maximum (line pressure).

The clutch pressure is controlled according to the following seven patterns:

(1) Neutral mode

When a shift position selector is situated at N or P and the oil pressure clutch is completely disengaged, the clutch pressure is the minimum pressure (zero) and the oil clutch is turned off.

(2) Hold mode

When the shift position selector is situated at D or R and the throttle is set to indicate no intention to travel, or when it is desired to cut off the engine torque by slowing down during travel, the clutch pressure is high enough in level for the clutch to slightly engage (3.5–4.0 kg/cm$^2$), and produces a semi-engaged clutch state (creep state).

(3) Snow mode

The target belt ratio value is determined according to the opening of the throttle at the time of the start from a memory map correlating the opening of the throttle to a target belt ratio value.

(4) Normal start mode

When the clutch is engaged at the time of starting or after the clutch has been disengaged, the clutch pressure is set to a proper level according to an engine generated torque (clutch input torque), for preventing the blowing up of the engine and for effecting smooth operating of the vehicle.

(5) Special start mode (a) The speed of the vehicle is above 8 km/h and a shift selection is repeatedly changed, such as D to N to D, or (b) At the time of a slow down when driving, the braking state is cancelled when 8 km/h < vehicle speed < 15 km/h.

(6) Coast mode

The rotations of the input shaft and the output shaft of the clutch are synchronized to make the amount of clutch slip constant (for instance 50 rpm).

(7) Drive mode

With a complete travel state established, with the clutch completely engaged (clutch lock up state) or substantially in the lock up state after shifting from a start mode, the clutch pressure is set to a level high enough to completely endure the engine torque.

Of these patterns, neutral mode (1) is executed exclusively by a changeover valve (not shown in the drawings) interlocked with the shift selector, the other modes (2), (3), (4), (5), (6) and (7) being executed by appropriately controlling of duty ratios of control signals for the first, second and third three-way electromagnetic valves 52, 60 and 68 by the control unit 90. Especially in the state (5), the oil passage 40 communicates with the tenth oil passage 72 through the clutch pressure control valve 62 to generate the maximum pressure by making the clutch pressure the same as the line pressure.

The primary pressure control valve 44, the line pressure control valve 54 and the clutch pressure control valve 62 are respectively controlled by the output oil pressure from the first, second and third three-way electromagnetic valves 52, 60 and 68, and a control oil pressure for use by the first, second and third threeway electromagnetic valves 52, 60 and 68 is a constant oil pressure regulated by constant pressure control valve 48. This control oil pressure is always lower than the line pressure, and is a stable and constant pressure. The control oil pressure is also supplied to the control valves 44, 54 and 62 to stabilize them.

Now, the electronic control of the continuously variable transmission 2 will be explained.

The continuously variable transmission 2 is oil pressure controlled, and the proper line pressure for holding the belt and transferring the torque, the proper primary pressure for changing the belt ratio, and the proper clutch pressure for effectively engaging the oil pressure clutch 74 are all set by respective commands from the control unit 90.

Based on the flowchart of FIG. 2, the control of the belt ratio will now be explained.

When the program starts, whether the system is in the neutral mode or not is initially determined (step 201). When the result in step 201 is YES because it is in the neutral mode, then in a step 202 a mode RDIMOD for outputting a fixed duty ratio value is implemented.

In the step 201, in the case of a NO because the system is in a mode other than the neutral mode, whether it is in the hold mode or not is determined in a step 203.

In this step 203, in the case of a YES due to the hold mode, whether the snow mode is in effect or not is determined in a step 204. In this step 204, in the case of no snow mode the result is NO, the mode RDIMOD for outputting the fixed duty ratio value is implemented in a step 205. In the step 204, when the snow mode is in effect, a ratio control mode RATMOD for feeding back the belt ratio to the belt ratio value selection based on the opening of the throttle and the speed of the vehicle is implemented in a step 206.

Figure 3:
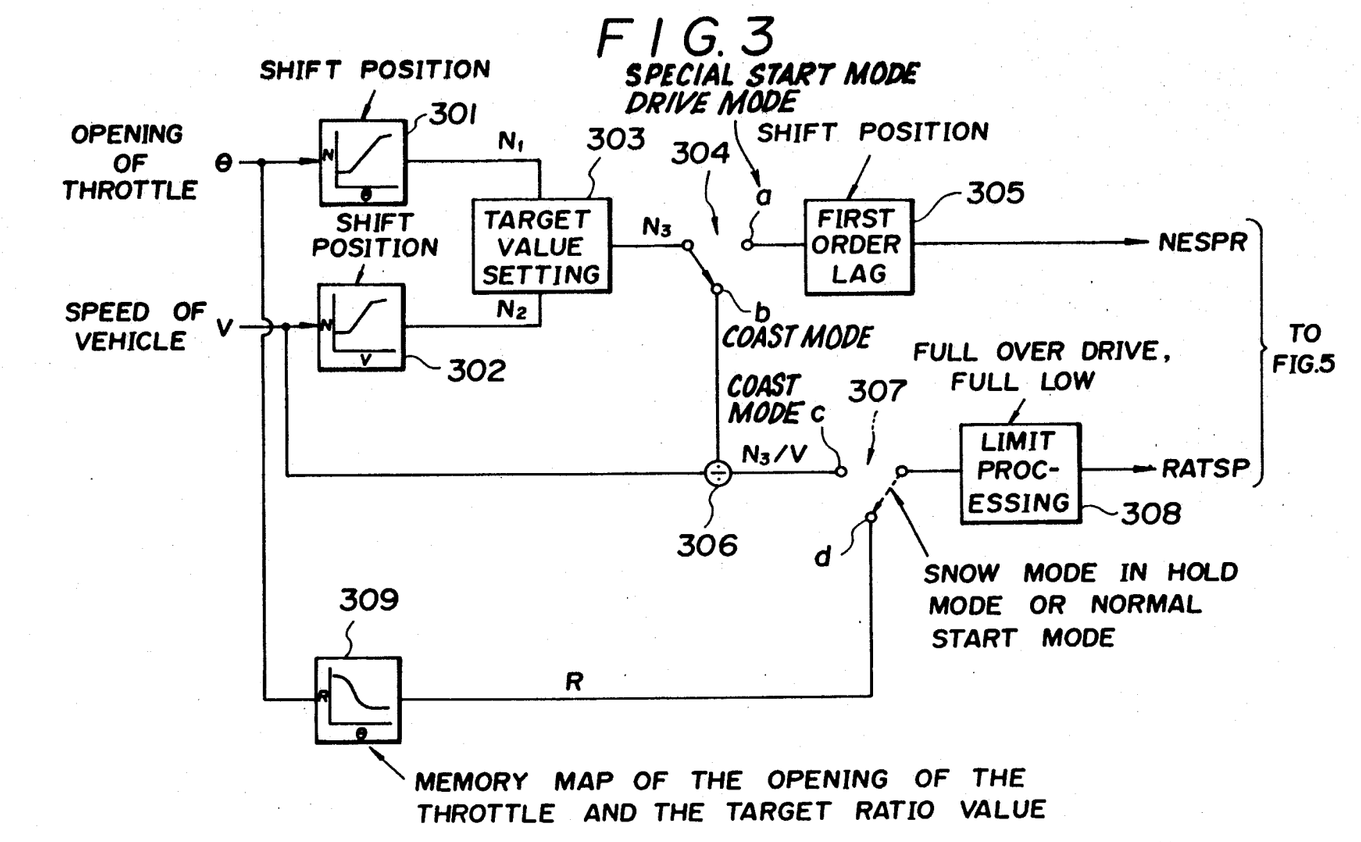
FIG. 3 is a block diagram of part of a control function for belt ratio control in the embodiment of FIG. 1.

Namely, as shown in FIG. 3, initially the opening $\theta$ of the throttle and the shift selector position are used to determine a first revolution value $N_1$ at 301 from a relationship between the opening of the throttle and the number of engine revolutions which is set forth in a first table. The speed of the vehicle V and the shift selector position are used to determine a second revolution value $N_2$ at 302 from a relationship between the speed of the vehicle V and the number of engine revolutions which is set forth in a second table.

Then, the first revolution value $N_1$ and the second revolution value $N_2$ are used to set a target revolution value $N_3$ (303), to which is applied a first order lag filter (305) determined by the shift selector position when a first switching part 304 is set to a first contact "a" to thereby obtain a target number of revolutions obtained by a speed change schedule map.

When the target revolution value $N_3$ passes to a second contact "b" of the first switching part (304), this target revolution value $N_3$ is divided by the speed of the vehicle V at 306 and is then subjected to a limit processing (308) for the full overdrive and the full low when a second switching part 307 is set to a third contact "c". In the case of the snow mode in the hold mode or normal start mode, the target belt ratio value is set by using the opening of the throttle $\theta$ to select a target belt ratio value R from a memory map shown at 309 and also in FIG. 4, this target belt ratio value being fed to the limit processing (308) when the second switching part (307) is set to a fourth contact "d". After the limit processing (308), the target belt ratio value RATSP is obtained.

In FIG. 5, the target number of revolutions NESPR obtained in FIG. 3 is compared with the number of the revolutions NE of the engine (401), and a difference therebetween is multiplied by a proportional gain KAE (402) to obtain an engine revolution number for use in control mode RNEMOD when feeding back the number of revolutions of the engine. The target belt ratio value RATSP obtained in FIG. 3 is compared in FIG. 5 with the belt ratio RATC (403), and a difference therebetween is multiplied by the proportional gain KAR (404) to obtain a value for use in the ratio control mode RATMOD when feeding back the belt ratio.

The engine revolution number value for control mode RNEMOD or the ratio value for control mode RATMOD is selected by a fifth contact "e" or sixth contact "f" of a third switching part (405) based on the presence of mode RNEMOD or mode RATMOD, and is multiplied by a gain KBR (406) to yield EIR.

A fourth switching part (407) is operated for the conditions RATC <0.60 and EIR <0, or RATC >2.04 and EIR $\geq$0, the output of 407 being multiplied by an integrating gain (DIIR) (408), and added (409) to a preceding value $Z^{-1}$ (411) which was processed at 410. The value from 406 and the value from 411 are added at 412, and at 415 a value RN selected at 414 from a table on the basis of oil temperature has subtracted from it a value from 412 which has been processed at 413.

Then, this difference is processed (416) and, based on the presence or absence of the mode RDIMOD at 418, a fixed duty ratio value or a clutch solenoid duty ratio value OPWRAT is output. In FIG. 2, in the case of NO due to a mode other than the hold mode in step 203, whether the system is in the normal start mode or not is decided in a step 207. In this step 207, in the case of YES due to the normal start mode, whether the snow mode is in effect or not is decided in a step 208.

In this step 208, in case of YES because it is in the snow mode, it moves to the step 206 to shift to the control mode RATMOD for feeding back the belt ratio to the target belt ratio value determined based on the opening of the throttle and the speed of the vehicle. In the step 208, in case the snow mode is not in effect and means NO, the mode RDIMOD for outputting a fixed duty value is implemented in a step 209.

In the step 207, in the case of NO because the mode is not the normal start mode, the presence of special start mode is checked in a step 210. In this step 210, in the case of YES due to the special start mode, the engine revolution number control mode RNEMOD for feeding back the number of revolutions of the engine to the target number of engine revolutions determined from the opening of the throttle and the speed of the vehicle is implemented in a step 211.

In the case of NO because the mode is not the special start mode in step 210, whether it is the coast mode or not is checked in a step 212. In the case of YES due to the coast mode in step 212, the control mode RATMOD for feeding back the belt ratio to the target belt ratio value determined from the opening of the throttle and the speed of the vehicle is implemented in a step 213.

In the step 212, in the case of NO because the mode is not the coast mode, whether it is the drive mode or not is checked in a step 214.

In this step 214, in the case of YES due to the drive mode, the control mode RNEMOD for feeding back the number of engine revolutions to the target number of revolutions determined by the throttle opening and vehicle speed is implemented in a step 215. In the step 214, in the case of NO because the mode is not the drive mode, control is returned.

Consequently, at the time of starting on a road having a small road surface friction coefficient, the vehicle is not started from the full low but, according to the snow mode, the ratio is set to an intermediate belt ratio to transfer low engine torque, thereby preventing the wheels from slipping and facilitating easy starting.

Since the control mode of the belt ratio uses a conventional control mode, a large change in the program is not required, which is practically advantageous.

As explained above, there are three control modes, namely RDIMOD, RNEMOD and RATMOD. The control mode RDIMOD is used for neutral mode, the hold mode for a no-snow condition, and the normal start mode for a no-snow condition. As shown in FIG. 5, the switch 418 is set to the dotted line position for RDIMOD. As evident from FIG. 5, the outputs of blocks 402 and 404 are respectively used for the remaining two control modes RNEMOD and RATMOD, and thus the switch 418 must necessarily be set to the solid line position for both RNEMOD and RATMOD, and the switch 405 must obviously be set to positions "e" and "f" for RNEMOD and RATMOD respectively. Block 402 clearly requires NESPR as an input during RNEMOD, and as evident from FIG. 3 NESPR can be generated only is switch 304 is in position "a". Since as discussed previously, RNEMOD is used for the special start and drive modes, switch 304 is set to position "a" for special start and drive. In FIG. 5, block 404 clearly requires RATSP as an input during RATMOD, and thus in FIG. 3 switch 307 must be appropriately set during RATMOD. As discussed previously, RATMOD is used during the hold mode for a snow condition, the normal start mode for a snow condition, and the coast mode, and FIG. 3 shows switch 307 is set to "d" for the snow mode in hold or special start, and thus the setting "c" is necessarily used for coast. When switch 307 is set to "c", switch 304 obviously must be set to "b" to provide the required input to block 306.

In the embodiment disclosed above, the option switch is added in order to select the snow mode, but it is to be understood that a combination of the existing input signals may be used without adding other switches, for example in that snow mode is selected when the shift lever is set to a L range while the P/E (power/economy) switch is turned on.

As apparent from the detailed explanation hereinabove, according to the present invention the control unit for controlling the belt ratio to have the target belt ratio value set by the opening of the throttle, at the time of starting on a road with a small road surface friction coefficient controls the belt ratio to an intermediate belt ratio transferring the low engine torque to effectively prevent the wheels from slipping and thus achieve easy starting.

According to the embodiment of the present invention, the conventional ratio control mode can be used to avoid a large change in the program, which is a practical advantage.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A belt ratio controller for a continuously variable transmission, comprising means for controlling a speed change by increasing and decreasing the width of a groove between a fixed pulley part and a movable pulley part of the transmission by varying an oil pressure to increase and decrease the rotating radius of a belt wound on the pulley parts and thereby change a belt ratio, surface condition indicating means for generating a signal indicating whether the vehicle is on a slippery surface, and control means responsive to said signal indicating the vehicle is on a slippery surface for controlling the belt ratio toward a target belt ratio value set based on the opening of a throttle at the time of starting vehicle movement.

2. A belt ratio controller according to claim 1, including a clutch, said control means including means for effecting progressive engagement of said clutch, said time of starting being a time period during progressive engagement of said clutch from a disengaged condition to a fully engaged condition.

3. A belt ratio controller according to claim 1, wherein said target belt ratio value is respectively set to a first ratio and to a second ratio substantially higher than said first ratio during said time of starting when said indicating means is indicating that the vehicle is respectively on a slippery surface and a non-slipper surface.

4. A belt ratio controller according to claim 1, wherein said indicating means is a manually operable switch.

5. A belt ratio controller according to claim 1, wherein said control means effects feedback control of said belt ratio toward said target belt ratio value during said time of starting.

6. A transmission apparatus for a vehicle, comprising a variable drive ratio mechanism which can implement a low drive ratio and a high drive ratio, a clutch, surface condition indicator means having first and second states for respectively indicating that a surface on which the vehicle is disposed respectively has first and second coefficients of friction, said first coefficient of friction being substantially less than said second coefficient of friction, and control means for progressively engaging said clutch during a predetermined operational mode and for causing said drive ratio mechanism to control said drive ratio respectively to said low drive ratio and said high drive ratio during said predetermined operational mode when said indicator means respectively has said first and second states, wherein said control means effects feedback control of said drive ratio to said low drive ratio during said predetermined operational mode when said indicator means has said first state.

7. A transmission apparatus according to claim 6, wherein said predetermined operational mode exists during progressive engagement of said clutch from a disengaged state thereof to a fully engaged state thereof.

8. A transmission apparatus according to claim 6, wherein said variable drive ratio mechanism is a continuously variable mechanism.

9. A transmission apparatus according to claim 6, wherein said surface condition indicator means includes a manually operable switch which produces an electrical signal, said first and second states being respective electrical voltages of said signal.

10. A transmission apparatus for a vehicle, comprising a variable drive ratio mechanism which can implement a low drive ratio and a high drive ratio, a clutch, surface condition indicator means having first and second states for respectively indicating that a surface on which the vehicle is disposed respectively has first and second coefficients of friction, said first coefficient of friction being substantially less than said second coefficient of friction, and control means for progressively engaging said clutch during a predetermined operational mode and for causing said drive ratio mechanism to control said drive ratio respectively to said low drive ratio and said high drive ratio during said predetermined operational mode when said indicator means respectively has said first and second states, wherein said control means effects feedback control of said drive ratio respectively to said low drive ratio and said high drive ratio during said predetermined operational mode when said indicator means respectively has said first and second states.

* * * * *

UNITED STATES PATENT AND TRADEMARK OFFICE
CERTIFICATE OF CORRECTION

PATENT NO. : 5 069 086

DATED : December 3, 1991

INVENTOR(S) : Katsuaki MURANO et al.

It is certified that error appears in the above-identified patent and that said Letters Patent is hereby corrected as shown below:

On the title page, Item [54], Title     replace "Vaiable"
    with ---Variable---.

Column 10, line 57; replace "non-slipper" with
    ---non-slippery---.

Signed and Sealed this

Thirtieth Day of March, 1993

*Attest:*

STEPHEN G. KUNIN

*Attesting Officer*     *Acting Commissioner of Patents and Trademarks*